(12) United States Patent
Setono

(10) Patent No.: US 8,094,527 B2
(45) Date of Patent: Jan. 10, 2012

(54) OPTICAL DISK APPARATUS

(75) Inventor: Shingo Setono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 600 days.

(21) Appl. No.: 12/289,435

(22) Filed: Oct. 28, 2008

(65) Prior Publication Data

US 2009/0122688 A1    May 14, 2009

(30) Foreign Application Priority Data

Nov. 8, 2007    (JP) ................... 2007-290924

(51) Int. Cl.
*G11B 7/00* (2006.01)
(52) U.S. Cl. ............... 369/44.25; 369/44.32; 369/44.41
(58) Field of Classification Search ............ 369/112.23, 369/44.29, 44.27, 53.21, 53.23, 44.36
See application file for complete search history.

(56) References Cited

U.S. PATENT DOCUMENTS 5,671,203 A * 9/1997 Ra ........................... 369/53.23
6,628,591 B1 * 9/2003 Yokota et al. ............ 369/53.21
6,985,412 B1 * 1/2006 Bradshaw et al. ........ 369/44.29
2004/0136280 A1    7/2004 Fujiune et al. ............ 369/44.32

FOREIGN PATENT DOCUMENTS

| EP | 1 724 257 A1 | 7/1996 |
|----|--------------|--------|
| JP | 2000-311427 | 11/2000 |
| JP | 2006-323936 | 11/2006 |
| JP | 2007-018632 | 1/2007 |
| JP | 2007-035083 | 2/2007 |
| JP | 2007-172738 | 7/2007 |

* cited by examiner

*Primary Examiner* — Joseph Haley
(74) *Attorney, Agent, or Firm* — Morgan, Lewis & Bockius LLP

(57) ABSTRACT

An optical disc apparatus includes: a first signal generating portion which generates a first signal that is obtained by processing signal which is output from the photo detecting portion, and which shows a peak in case where a focus position of an objective lens is matched on a recording surface of an optical disc; a second signal generating portion which generates a second signal that is obtained by slicing the first signal at a prescribed level to be digitalized; and a movement stopping portion which stops moving of the objective lens if the second signal is asserted by existence of the recording surface that is a target to be reproduced or to be recorded, then it is negated, and the state to be negated is continued for a prescribed time interval when focus control is performed.

4 Claims, 6 Drawing Sheets

OPTICAL DISK APPARATUS

This application is based on Japanese Patent Application No. 2007-290924 filed on Nov. 8, 2007, and the contents of which are hereby incorporated by reference.

BACKGROUND OF THE INVENTION

1. Field of the Invention

The present invention relates to an optical disc apparatus which is used to perform reproducing of information that is recorded on an optical disc or recording of information on an optical disc, especially the present invention relates to technology to prevent collision between a lens and the optical disc.

2. Description of Related Art

Optical disc such as a compact disc (hereinafter referred to as a CD) and a digital versatile disc (hereinafter referred to as a DVD) are widely available from past. Further, optical disc which can record much large capacity of information, such as blu-ray disc (hereinafter referred to as a BD) or the like are developed recently for practical use. For these optical discs, an optical disc apparatus which has an optical pickup is used to perform reproducing of information that is recorded or recording of information.

The optical pickup is made movable along a radial direction of the optical disc and performs reproducing of information which is recorded on the optical disc or recording of information on the optical disc by irradiating light on the optical disc.

In case where reproducing or recording of information is performed utilizing the optical pickup, it is necessary that control is performed such that focus of light which is emitted from a light source is always matched on a recording surface of the optical disc irrespective of waving of surface of the optical disc or the like. (Hereafter, this kind of control is referred to as focus control.) For this purpose, an objective lens which focuses the light emitted from the light source on the recording surface of the optical disc can be moved along a focus direction by an objective lens actuator in the optical pickup. Here, the focus direction is a direction along which the objective lens comes closer to or goes away from the optical disc, and the direction is perpendicular to the recording surface of the optical disc.

In the optical pickup, it is necessary that spot size of light spot which is formed on the optical disc by the light emitted from the light source is made small to be applicable to the optical disc which can record information with high density (for example, BD). As for a method to make the spot size of the light spot small, it is usually performed to make wavelength of the light source from which the light is emitted, shorter and at the same time to make numerical aperture of the objective lens larger.

However, if the numerical aperture of the objective lens is made larger as above described, space between tip of the objective lens and the optical disc (working distance; WD) becomes narrower when reading out or recording on of information for the optical disc is performed by the optical pickup. Here, if explanation about the WD is given more correctly, the WD is distance from the tip of the objective lens to surface of the optical disc when the focus position of the objective lens is matched on the recording surface of the optical disc (See, FIG. 7).

That is, in the optical pickup which requires an objective lens that has large numerical aperture (for example, optical pickup which is formed to perform reading out of information recorded on the BD or recording of information on the BD) the WD becomes very short. Then, if the WD becomes very short, it causes a problem that possibility of collision between the objective lens and the optical disc becomes large. It should be noted that, if the optical pickup formed to perform reading out of information and the like recorded on the DVD or the CD is mounted on an apparatus that requires thinner in size such as note type personal computer and the like, the situation where the WD becomes very short, also happens in the optical pickup. Even in such case, it causes a problem of collision between the objective lens and the optical disc.

Because of these reasons, it is conventionally performed that a protector to prevent collision is made, for example, on the lens holder to hold the objective lens in order to prevent that information recorded on the optical disc may become non readable, or the optical pickup may become non usable due to damage on the objective lens by the collision between the objective lens and the optical disc. (For example, see JP-A-2007-18632, or JP-A-2007-35083.)

However, in case where structure which is shown in JP-A-2007-18632, or JP-A-2007-35083 is employed, the possibility of collision between the protector to prevent the collision and the optical disc remains high still. Then, if the collision of this kind occurs, even though the optical disc is not damaged, there may be a problem that information recorded on the optical disc becomes non readable or the like because ground coom of the protector to prevent the collision which is ground by the collision adheres on the optical disc.

Further, the collision between the objective lens and the optical disc tends to happen when the objective lens is moved along the focus direction to begin the focus control. Further, in an operation to begin the focus control, damage caused by the collision becomes large if the protector to prevent the collision and the optical disc collide with each other when it fails to begin the focus control because the optical disc is in rotating state. Therefore, it is required that this kind of collision is prevented when the focus control is performed.

SUMMARY OF THE INVENTION

In view of the above described problems, it is an object of the present invention to provide an optical disc apparatus by which possibility of collision between the objective lens and the optical disc can be reduced when focus control is performed.

To attain the above described object, an optical disc apparatus in accordance with the present invention includes: a light source; an objective lens which focuses light that is emitted from the light source on a recording surface of an optical disc; a photo detecting portion which receives reflected light that is reflected by the optical disc to perform photoelectric conversion; an objective lens actuator which moves the objective lens along a focus direction; a focus control portion which performs focus control such that a state is realized where a focus position of the objective lens is always matched on the recording surface by controlling the objective lens actuator; a first signal generating portion which generates a first signal that is obtained by processing signal which is output from the photo detecting portion, and which shows a peak in case where the focus position of the objective lens is matched on the recording surface; a second signal generating portion which generates a second signal that is obtained by slicing the first signal at a prescribed level and digitalizing; and a movement stopping portion which stops moving of the objective lens if the second signal is asserted by existence of the recording surface that is a target to be reproduced or to be recorded, then it is negated, and the state to be negated is continued for a prescribed time interval which is obtained by below formula (1) when the focus control is performed.

the prescribed time interval $T=t\times((\alpha\times WD)/L)\times(v1/v2)$ (1)

where t: a time lapse to move which is actually measured that is required for the focus position of the objective lens to move from the surface of the optical disc to the recording surface when the objective lens is moved in a prescribed speed, α: a coefficient which fulfils 0<α<1, WD: distance from tip of the objective lens to the surface of the optical disc when the focus position of the objective lens is matched on the recording surface, L: distance from the surface of the optical disc to the recording surface, v1: moving speed of the objective lens when the actually measured value t is seeked, and v2: moving speed of the objective lens when the objective lens is moved in case where the focus control is started.

By this arrangement, moving of the objective lens is stopped, if the second signal is asserted, then continues to be negated for a prescribed time interval. Here, the state where the second signal is asserted and then it is negated, shows a state where focus position of the objective lens is matched on the recording surface of the optical disc and then it becomes out focus. Because of this, by the structure in accordance with the present invention, it becomes possible to prevent the objective lens colliding with the optical disc because it moves too much. Further, it becomes possible to make malfunction hard to occur even when chattering of the signal happens because moving of the objective lens is not at once stopped just after it is confirmed that the second signal is negated. Further, by the structure in accordance with the present invention, it is possible to perform operation to prevent the collision between the objective lens and the optical disc with reducing fluctuation among the apparatus while malfunction caused by the chattering of the signal is prevented because it is structured to calculate the prescribed time interval T using the actually measured value t.

Further, it is no problem in the present invention that the actually measured value t is a time which is seeked when kind of the optical disc that is loaded on the apparatus is discriminated in the optical disc apparatus which is structured as above described.

By this arrangement, parameter necessary to perform the operation to prevent the collision between the objective lens and the optical disc is obtained when kind of the optical disc is discriminated. Therefore, flow of operation to prevent the collision between the objective lens and the optical disc can be simplified because it is not necessary to obtain separately the above described parameter when the focus control is performed. As a result, waiting time until reproducing or recording is begun can be minimized.

Further, it is no problem in the present invention that the photo detecting portion is provided with a plurality of photo receiving areas and the first signal is a summed up signal of signals that are output from the plurality of photo receiving areas in the optical disc apparatus which is structured as above described.

By this arrangement, it is easy to realize structure in which it is easy to make judgment whether the focus position of the objective lens is matched on the recording surface or not, and it is easy to prevent the collision between the objective lens and the optical disc, too.

As above described, in accordance with the present invention, an optical disc apparatus is provided by which possibility of collision between the objective lens and the optical disc can be reduced when the focus control is performed. Further, such optical disc apparatus can be provided with reducing fluctuation among the apparatus. That is, it is possible to provide an optical disc apparatus with high reliability.

DETAILED DESCRIPTION OF THE PREFERRED EMBODIMENTS

Hereinafter, embodiment of the present invention will be explained in detail with reference to drawings.

Figure 1:
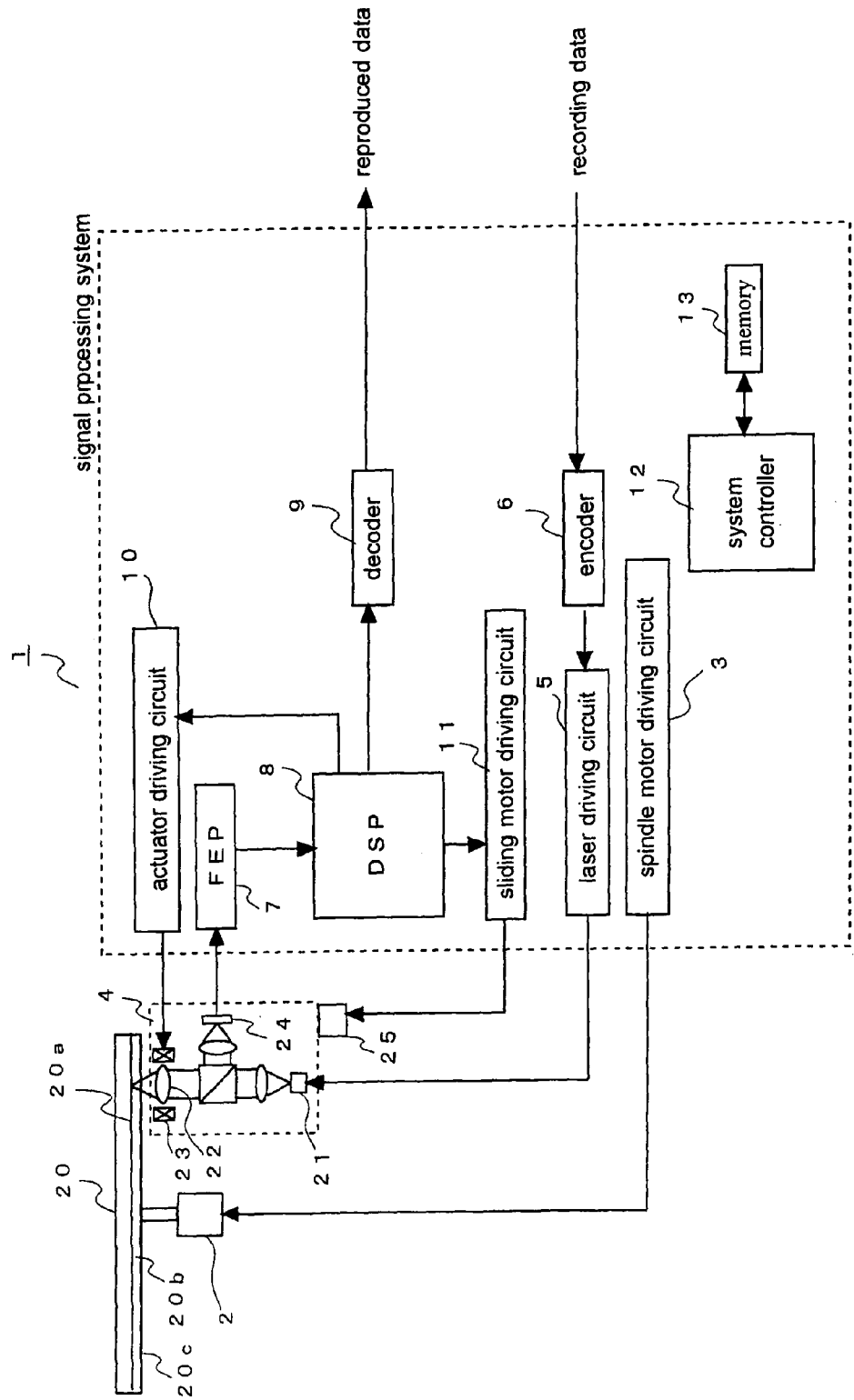
FIG. 1 is a block diagram to show structure of an optical disc apparatus according to the present embodiment.

FIG. 1 is a block diagram to show structure of an optical disc apparatus according to the present embodiment. The optical disc apparatus 1 according to the present embodiment is made to enable reproducing of information in an optical disc 20 and recording of information on the optical disc 20, and kind of the optical disc 20 for which recording and reproducing of information can be performed is, a BD, a DVD, and a CD.

A spindle motor 2 is connected to a turntable (not shown) to enable the turntable being rotated. Further, the turntable holds detachably the optical disc 20. As a result, the optical disc 20 which is held on the turntable can be rotated by rotating the spindle motor 2. Driving control of the spindle motor 2 is performed by a spindle motor driving circuit 3.

An optical pickup 4 irradiates laser light which is emitted from a laser diode (light source) 21 on the optical disc 20 to enable recording of information on the optical disc 20 and reading out of information that is recorded on the optical disc 20. As shown in FIG. 1, the optical pickup 4 is provided with the laser diode 21, an objective lens 22 which focuses the laser light that is emitted from the laser diode 21 on a recording surface 20a of the optical disc 20, an actuator (objective lens actuator) 23 which makes the objective lens 22 movable in a focus direction and a tracking direction, and a photo detector 24 which receives reflected light that is reflected by the optical disc 20 to perform photoelectric conversion.

It should be noted that the focus direction means a direction along which the objective lens comes closer to or goes away from the optical disc 20 and the direction is perpendicular to the recording surface 20a. (In FIG. 1, it corresponds to the vertical direction of the drawing.) Further, the tracking direction means a direction which is parallel to a radial direction of the optical disc 20. (In FIG. 1, it corresponds to the horizontal direction of the drawing.)

Further, the optical disc apparatus 1 according to the present embodiment is made applicable to the BD, the DVD, and the CD as above described, and the laser diode 21 is made possible to emit the laser light for the BD (for example, wavelength of 405 nm), for the DVD (for example, wavelength of 650 nm), and for the CD (for example, wavelength of 780 nm) by switching.

Further, the optical pickup 4 is made possible to move in the radial direction of the optical disc 20 (it corresponds to the horizontal direction of FIG. 1) by driving of a sliding portion 25 to access any address of the optical disc 20. The sliding portion 25 is provided with, for example, a sliding motor, a pinion which is rotated by the sliding motor, and a rack which meshes with the pinion (all are not shown), and they make the optical pickup 4 move utilizing relation of the rack and the pinion.

A laser driving circuit 5 performs laser power control of the laser light which is emitted from the laser diode 21 that is included in the optical pickup 4 utilizing light amount which is received by the photo receiving element for front monitoring that is not shown, and performs switching control when laser light that has different wavelength is emitted. Further, when recording is performed, the laser driving circuit 5 receives a recording signal which is input from outside and processed by an encoder 6 to make the laser diode 21 oscillate corresponding to the received signal.

It should be noted that the encoder 6 adds an error correcting code (ECC) to the recording data which is received from outside, and performs encoding of it by a prescribed recording code method. Further, the encoder 6 generates pulse for recording (recording pulse) for the encoded recording signal in compliance with a prescribed writing strategy. The term "writing strategy" means control rules for the recording pulse.

A front end processor (FEP) 7 is supplied an electric signal from the photo detector 24 which is included in the optical pickup 4. The FEP 7 performs various kinds of processing calculation, gain adjustment, noise elimination, and the like about the supplied electric signal. To be more concrete, in the FEP 7, a reproduced RF signal, a focus error signal (FE signal), a tracking error signal (TE signal), a summed up signal (whose detail will be explained later), and the like are generated by the processing calculation. Then, these generated signals are output to a digital signal processor (DSP) 8 which will be described later.

The DSP 8 performs analog-digital conversion (AD conversion) to a reproduced RF signal that is supplied from the FEP 7 to be synchronized with clock which is generated by a synchronizing signal generating circuit (not shown) which has circuit structure called a phase locked loop (PLL). The reproduced signal which is performed the AD conversion is output to a decoder 9.

The decoder 9 performs data demodulation and detects error in the data. When error is detected, the decoder 9 performs error correction process for the data if the error can be corrected. The reproduced data which is obtained by the decoder 9 is output to outside through an interface that is not shown in the drawing. It should be noted that the decoder 9 also plays a role to supply an error rate which is a rate of occurrence of reading error of the data, to a system controller 12.

The DSP 8 is provided with a servo control circuit, too. As a result, the DSP 8 controls driving of the actuator 23 through an actuator driving circuit 10 utilizing the FE signal and the TE signal which are output from the FEP 7 under control by the system controller 12 to perform the focus control and the tracking control. That is, the DSP 8 is one embodiment of the focus control portion in the present invention. Further, the DSP 8 performs control of a sliding motor which is provided in the sliding portion 25 enabling moving of the optical pickup 4 in the radial direction. Further, the DSP 8 also controls driving of the actuator 23 through the actuator driving circuit 10 when discrimination of kind of the optical disc 20 is performed, when focus drawing is performed, or the like.

The actuator driving circuit 10 makes the actuator 23 drive such that focus of the objective lens 22 is always matched on the recording surface 20a of the optical disc 20, in compliance with the focus control signal which is output from a servo controller circuit of the DSP 8. Further, the actuator driving circuit 10 makes the actuator 23 drive such that position of a light spot which is focused by the objective lens 22 always traces on a track of the optical disc 20 in compliance with the tracking control signal. Further, the actuator driving circuit 10 drives the actuator 23 by a signal from the DSP 8 when discrimination of kind of the optical disc 20 is performed, when focus drawing is performed, or the like.

A sliding motor driving circuit 11 controls driving of the sliding motor which is provided in the sliding portion 25 in compliance with a signal that is output from the DSP 8.

The system controller 12 is provided with a microprocessor and is connected with respective portions which compose the optical disc apparatus 1 through signal wires that are not shown to achieve proper control processing according to required operations which should be performed by the respective portions. Further, as will be explained later, the system controller 12 obtains the focus error signal, the summed up signal which will be described later, and a FOK signal which will be described later from the DSP 8. Then, the system controller 12 functions as a means to perform discrimination of kind of the optical disc 20, or functions as a means to prevent collision between the objective lens 22 and the optical disc 20 by stopping movement of the objective lens 22 if it is necessary when the focus control is performed. That is, the system controller 12 is one embodiment of a movement stopping portion which stops movement of the objective lens in the present invention.

It should be noted that to the system controller 12, a memory 13 is connected. In the memory 13, various parameters and operating programs and the like which are required for the system controller 12 to perform various operations, are stored.

Figure 2:
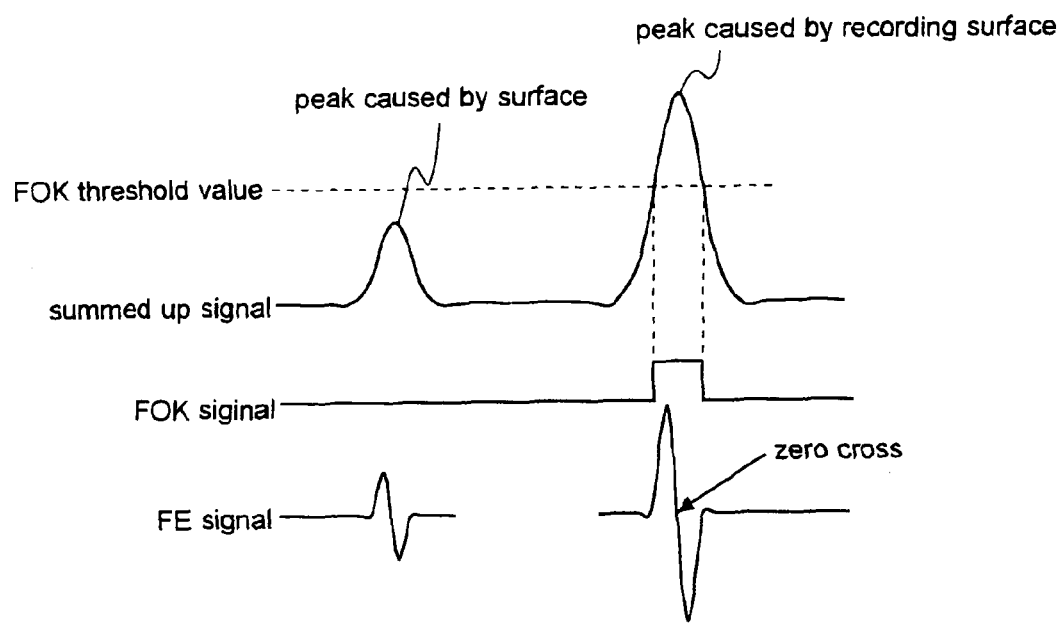
FIG. 2 is a diagram to explain signals which relate to an operation to prevent the collision in the optical disc apparatus according to the present embodiment.

Next, explanation will be given about a operation to prevent the collision which operates such that the optical disc 20 and the objective lens 22 do not collide with each other when the focus control is performed in the optical disc apparatus 1 according to the present embodiment. Prior to the explanation, signals which relate to the operation will be explained with reference to FIG. 2. It should be noted that FIG. 2 shows signals which are obtained in case where the objective lens 22 is moved from a position along a direction that the objective lens 22 comes closer to the optical disc 20.

The summed up signal means a signal which is obtained by adding all signals that are output from respective a plurality of photo receiving areas which are formed in the photo detector 24 (for example, four divided photo receiving areas), and whose level of the signal is changed in proportion to a light amount of reflected light from the optical disc 20. The summed up signal is generated in the FEP 7.

The summed up signal shows its peaks in case where the focus position is matched on the recording surface 20a and the surface 20c of the optical disc 20 (See, FIG. 1) when the objective lens 22 is moved in a direction along which the objective lens 22 comes closer to the optical disc 20. It should be noted that, as shown in FIG. 2, signal level of a peak that is caused by the recording surface 20a is higher than that of a peak that is caused by the surface 20c, because degree of reflection is larger at the recording surface 20a than at the surface 20c. That is, the summed up signal is a first signal in the present invention, and the FEP 7 is an embodiment of a first signal generating portion in the present invention.

The FOK signal is a signal which is obtained by slicing the summed up signal at a prescribed level (it corresponds to the level shown as FOK threshold value in FIG. 2) to be digitalized. The FOK signal is generated by the DSP 8 in the optical disc apparatus 1 according to the present embodiment. The FOK signal is a second signal in the present invention, and the DSP 8 is an embodiment of a second signal generating portion in the present invention.

It should be noted that the FOK threshold value is decided as a value that is larger than a peak value of the summed up signal which is obtained when the focus position of the objective lens 22 passes the surface 20c of the optical disc 20. Further, the FOK threshold value is decided as a value that is smaller than a peak value of the summed up signal which is obtained when the focus position of the objective lens 22 passes the recording surface 20a of the optical disc 20. By this arrangement, as shown in FIG. 2, the FOK signal remains in negated state even when the focus position of the objective lens 22 passes the surface 20c of the optical disc 20, and the FOK signal is asserted two times before and after when the focus position of the objective lens 22 passes the recording surface 20a of the optical disc 20.

In the optical disc apparatus 1 according to the present embodiment the focus error signal (FE signal) is structured such that the FE signal is obtained utilizing an astigmatism method and it is generated by the FEP 7. The focus error signal shows S-curve two times as shown in FIG. 2 when the focus position of the objective lens 22 passes the surface 20c of the optical disc 20, and when the focus position of the objective lens 22 passes the recording surface 20a of the optical disc 20. Then, the points where the S-curves cross the line zero (zero cross), show the state where the focus position of the objective lens 22 is matched on the surface 20c of the optical disc 20 and the recording surface 20a of the optical disc 20.

As a result, when the focus is drawn on the recording surface 20a, it is performed such that the objective lens 22 is moved toward the optical disc 20 to find out a point where the S-curve which is caused by the recording surface 20a makes the zero cross, then, the focus is drawn at the point to start the focus control.

Figure 3:
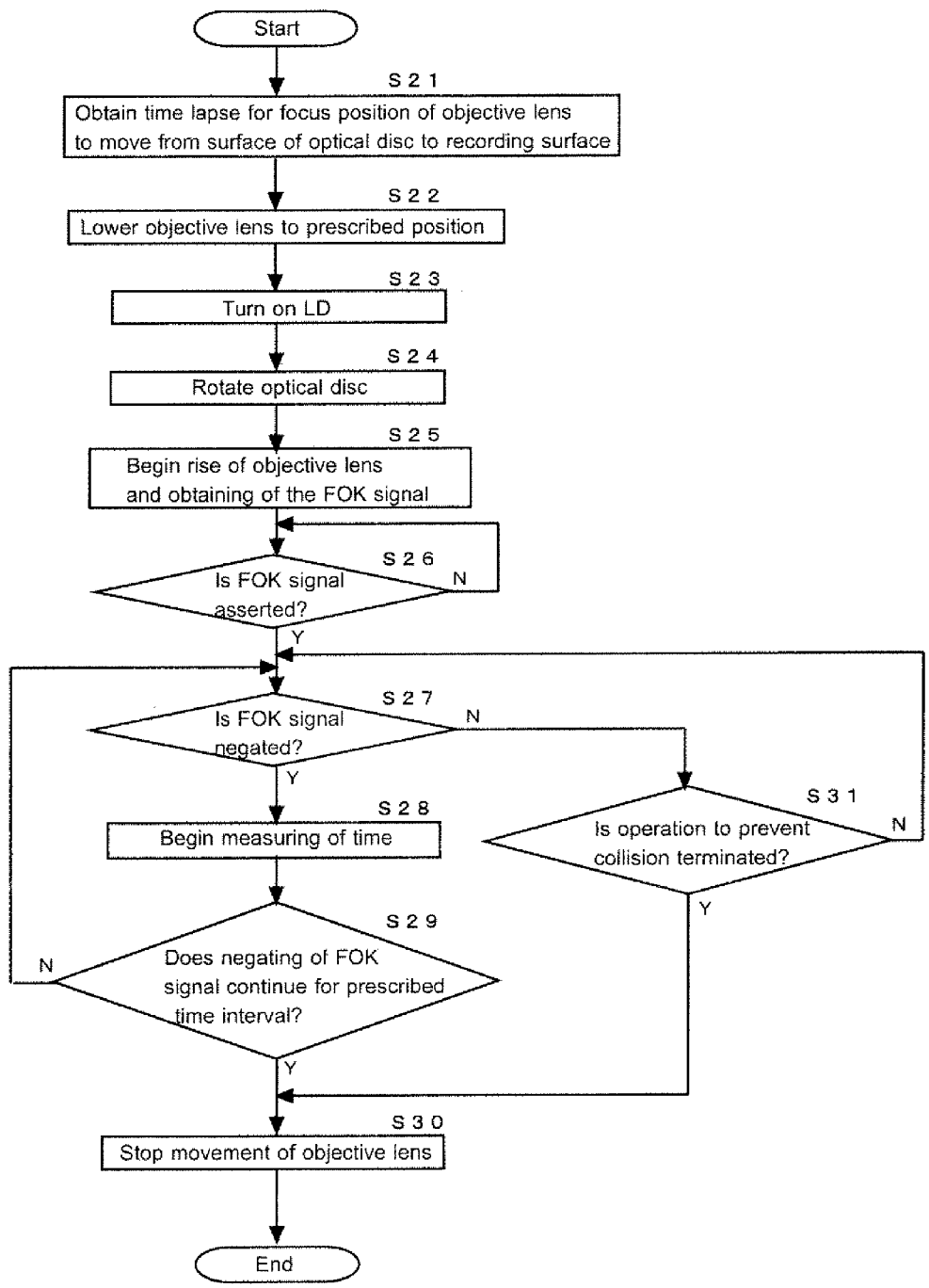
FIG. 3 is a flowchart to explain the operation to prevent the collision in the optical disc apparatus according to the present embodiment.

Next, explanation will be given about the operation to prevent the collision which act to prevent the collision between the optical disc 20 and the objective lens 22 when the focus control is performed with reference to FIG. 3. The operation to prevent the collision is started in case where the system controller 12 outputs a direction to the DSP 8 to begin the focus control. It should be noted that FIG. 3 is a flowchart to explain the operation to prevent the collision in the optical disc apparatus according to the present embodiment.

When the direction to perform the focus control is output, first, a time lapse for the focus position of the objective lens 22 to move from the surface 20c of the optical disc 20 to the recording surface 20a is obtained (step S21). The time lapse to move which is obtained here is used to calculate condition to stop movement of the objective lens 22 in order that the optical disc 20 and the objective lens 22 do not collide with each other, and detail of it will be explained later.

It should be noted that, in the present embodiment, it is structured that the time lapse to move is obtained in an operation by which kind of the optical disc 20 that is loaded on the apparatus, is discriminated. That is, to discriminate kind of the optical disc 20, there is a step in which the time lapse to move which is required for the focus position of the objective lens 22 to move from the surface 20c of the optical disc 20 to the recording surface 20a, is calculated, and result of this step is stored in the memory 13 to utilize by reading out from the memory 13.

Figure 4:
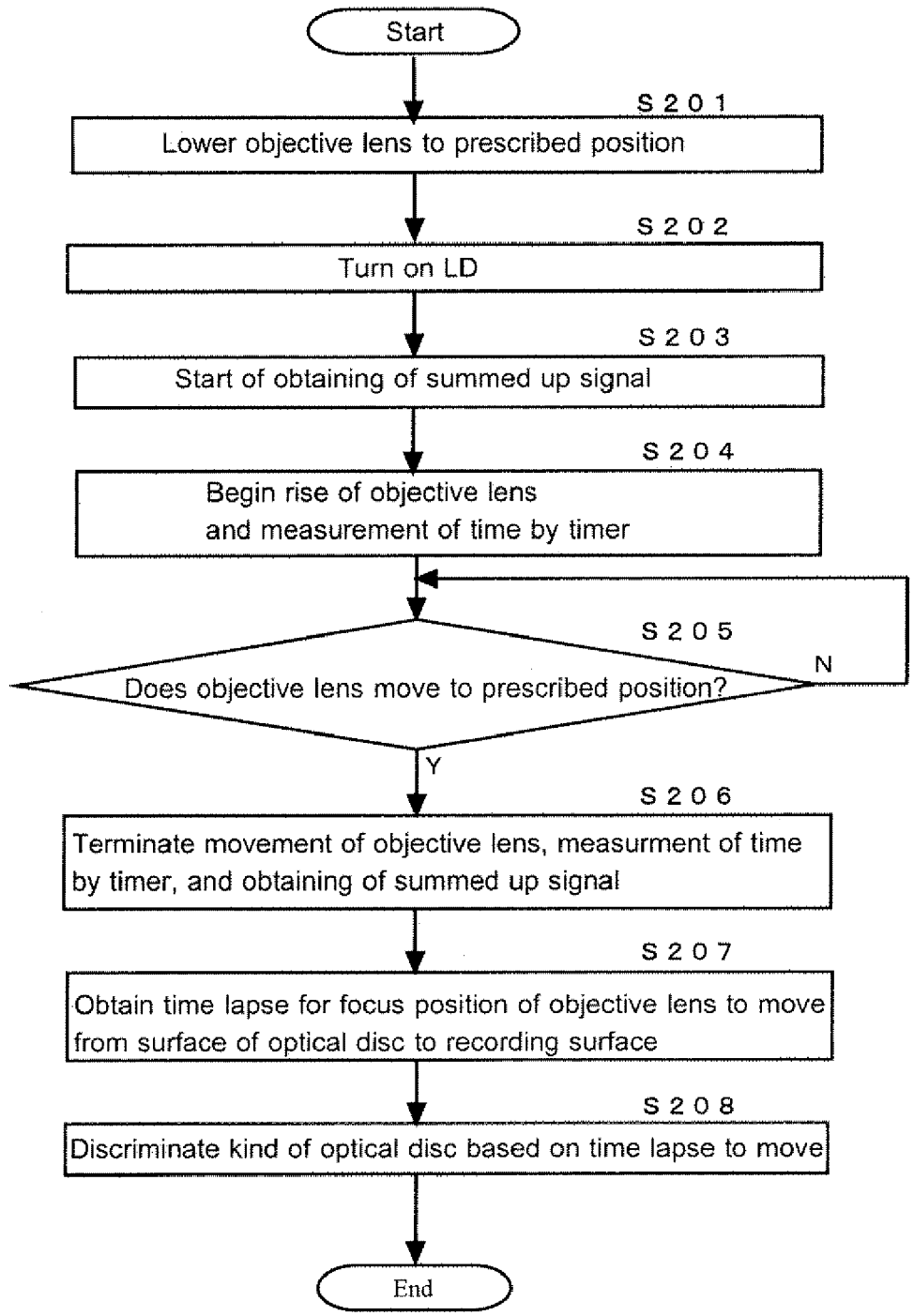
FIG. 4 is a flowchart to show a flow to discriminate kind of an optical disc in the optical disc apparatus according to the present embodiment.

Hereafter, a method to discriminate kind of the optical disc 20 in the optical disc apparatus 1 according to the present embodiment will be explained with reference to FIG. 4. When a direction to discriminate kind of the optical disc 20 is output from the system controller 12, the objective lens 22 is lowered down to a prescribed position (step S201). The prescribed position in this step is a position where the focus position of the objective lens 22 becomes enough lower than the surface 20c of the optical disc 20.

Next, the laser diode (LD) 21 is turned on (step S202). It should be noted that it does not make any difference that any wavelength of the laser light is emitted from the laser diode 21 among the wavelengths that can be emitted from the laser diode 21. However, if any wavelength of the laser light is emitted and the desired peak of the summed up signal is not obtained when an operation which will be described later is performed, it is necessary that the same operation will be performed again with changing properly the wavelength of the laser light that is emitted from the laser diode 21 in order that the desired peak can be detected.

When the laser diode 21 is turned on, obtaining of the summed up signal is started (step S203). Then, rise of the objective lens 22 and measurement of time by a timer are begun (step S204). Speed to move the objective lens 22 in this step is a prescribed speed (in the present embodiment the actuator 23 is driven by applying a constant voltage). Then, it is confirmed whether the objective lens 22 is moved to a prescribed position or not (step S205).

In case where the objective lens 22 is not moved to the prescribed position, rise of the objective lens 22 is continued and again it is confirmed whether the objective lens 22 is moved to the prescribed position or not. On the other hand when the objective lens 22 is moved to the prescribed position, movement of the objective lens 22, measurement of time by the timer, and obtaining of the summed up signal are terminated (step S206).

It should be noted that, even in a step where kind of the optical disc 20 is discriminated, there is possibility that the optical disc 20 and the objective lens 22 collide with each other when the objective lens 22 is moved. As a result, in the optical disc apparatus 1 according to the present embodiment, when kind of the optical disc 20 is discriminated, it is performed in a state where the optical disc 20 is not rotated. By this arrangement, it is hard to make the optical disc 20 and the objective lens 22 damage even when they collide with each other. Further, it is preferable that a protector to prevent the collision between the optical disc 20 and the objective lens 22 is made from this point of view.

Next, in the summed up signal which is obtained, the peak caused by the surface 20c of the optical disc 20 and the peak caused by the recording surface 20a are detected (See, FIG. 2). Then, the time lapse to move when the focus position of the objective lens 22 is moved from the surface 20c of the optical disc 20 to the recording surface 20a is obtained from the two detected peaks and result of measurement of the time by the timer (step S207). It should be noted that the time lapse to move is stored in the memory 13 as above described. Further, in case where the peak of the summed up signal is not obtained yet even in this step, the steps from S201 to S207 are repeated again with changing the wavelength of the laser light that is emitted from the laser diode 21 as above described.

When the time lapse to move is obtained in step S207, kind of the optical disc 20 is discriminated by comparison with a threshold value which is stored in the memory 13 in advance (step S208). In the BD, the DVD, and the CD, thickness of a transparent cover layer 20b (See, FIG. 1) to protect the recording surface 20a is different from each other. By this reason, the time lapse to move which is obtained in step S207 also become different depending on kind of the optical disc 20 that is loaded on the apparatus. As a result, kind of the optical disc 20 can be discriminated by obtaining the time lapse to move. It should be noted that the thickness of the transparent cover layer 20b is, for example, 0.1 mm for the BD, 0.6 mm for the DVD, and 1.1 mm for the CD.

Now return to FIG. 3 to restart the explanation on the operation to prevent the collision. After the time lapse to move in which the focus position of the objective lens 22 is moved from the surface 20c of the optical disc 20 to the recording surface 20a, is obtained, the objective lens 22 is made lower to a prescribed position (step S22). The prescribed position in this step is a position where the focus position of the objective lens 22 becomes enough lower than the surface 20c of the optical disc 20.

Next, the laser diode (LD) 21 is turned on (step S23). At this timing the wavelength of the laser light which is emitted from the laser diode 21 is a wavelength that corresponds to kind of the optical disc 20 which is loaded on the apparatus as a target to be recorded or to be reproduced. That is, if the optical disc 20 which is loaded on the apparatus is the BD, the laser light having the wavelength of 405 nm, if the optical disc 20 which is loaded on the apparatus is the DVD, the laser light having the wavelength of 650 nm, or if the optical disc 20 which is loaded on the apparatus is the CD, the laser light having the wavelength of 780 nm, is emitted.

When the laser light is emitted from the laser diode 21, the optical disc 20 is rotated (step S24), and the rise of the objective lens 22 and obtaining of the FOK signal by the system controller 12 are begun (step S25). Here, speed in which the objective lens 22 is raised, is a prescribed speed (In the present embodiment the actuator 23 is driven by applying a constant voltage).

When the rise of the objective lens 22 is begun, it is confirmed whether the FOK signal is asserted or not (step S26). The focus position of the objective lens 22 first passes the surface 20c of the optical disc 20 by the rise of the objective lens 22. At this timing the FOK signal remains in negated state still as above described (See, FIG. 2). On the other hand, when the focus position comes closer to the recording surface 20a of the optical disc 20, the FOK signal is asserted because the peak of the summed up signal becomes large as shown in FIG. 2.

In case where it is confirmed that the FOK signal is not asserted yet in step S26, it is judged that the focus position of the objective lens 22 has not yet come to the recording surface 20a of the optical disc 20. As a result, in this state rise of the objective lens 22 is continued further. Then, it is confirmed again whether the FOK signal is asserted or not.

On the other hand in case where it is confirmed that the FOK signal is asserted, it is judged that focus position of the objective lens 22 has come closer to the recording surface 20a of the optical disc 20. Then, in the state where the FOK signal is asserted, the point where the S-curve of the focus error signal makes the zero cross is detected for the DSP 8 to start the focus control.

However, at that timing there is possibility that detection of the S-curve is failed because the S-curve of the focus error signal is too small. In such case, the objective lens 22 is further raised toward the optical disc 20 because the focus control cannot be started. Further, even in case where detection of the S-curve is successfully completed and the focus control is started, there is still possibility that the focus control cannot be performed in stable manner and the objective lens 22 moves in uncontrollable manner.

In these cases, the FOK signal changes from a state being asserted to a state being negated because the focus position of the objective lens 22 departs from the recording surface 20a of the optical disc 20. Then, when they are left as they are without performing any operation, possibility of collision between the objective lens 22 and the optical disc 20 occurs. Because of this, control to prevent the collision becomes necessary.

As a result, after the confirmation of the FOK signal being asserted, is performed, it is confirmed whether the FOK signal is negated or not (step S27). In case where it is confirmed that the FOK signal is negated, measuring of time is begun by the timer from that time point (step S28). Then, it is confirmed whether it is continued or not that the FOK signal is negated for a prescribed time interval (step S29).

Figure 5:
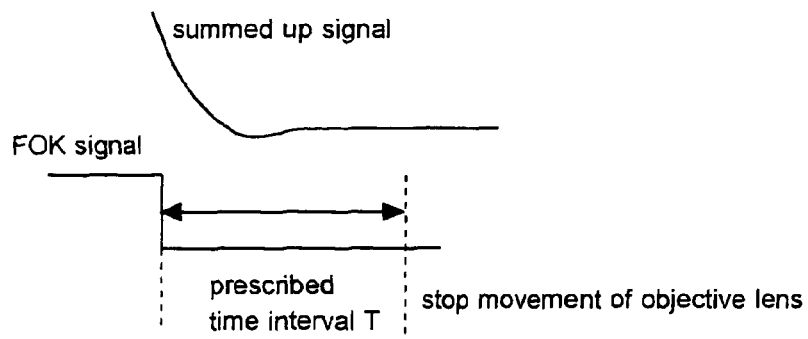
FIG. 5 is a diagram to explain relation between negating time interval of an FOK signal and stopping operation of an objective lens.

In case where the FOK signal is not continued to be negated for the prescribed time interval, the process is returned again to step S27 and it is again confirmed whether the FOK signal is negated or not. On the other hand, in case where it is confirmed that the FOK signal is continued to be negated for the prescribed time interval (T) as shown in FIG. 5, the system controller 12 outputs a direction to stop the movement of the objective lens 22 to the DSP 8. Then, the movement of the objective lens 22 by the actuator 23 is stopped (step S30).

It should be noted that FIG. 5 is a diagram to explain relation between negating time interval of the FOK signal and stopping operation of the objective lens 22.

On the other hand, in case where the FOK signal is not negated in step S27, focus position of the objective lens 22 is matched on the recording surface 20a of the optical disc 20 or it is near the recording surface 20a. As a result, it is confirmed whether the operation to prevent the collision between the optical disc 20 and the objective lens 22 is terminated or not (step S31). Then, in case where the operation to prevent the collision is not terminated, the process is returned again to step S27 and the operations above described are repeated further.

Next, explanation will be given about the prescribed time interval T in step S29. It is necessary to set up the time interval T such that sum of distance for the objective lens 22 to move after the focus position of the objective lens 22 passes the recording surface 20a till the FOK signal is changed to be negated and distance for the objective lens 22 to move in the prescribed time interval T becomes smaller than the working distance WD (which is decided by structure of the optical system of the optical pickup 4).

Therefore in the present embodiment, the prescribed time interval T is decided as a time interval such that the moving distance of the objective lens 22 from the time point when the FOK signal is negated, becomes a distance of one quarter of the WD. It is because that by the time interval of this extent probability of collision between the optical disc 20 and the objective lens 22 can be reduced with preventing malfunction by chattering of the signal.

It should be noted that, in fact, there is fluctuation in the moving speed of the objective lens 22 for every optical disc apparatus because sensitivity of the actuator 23 itself and the actuator driving circuit 10 as its driver is different in every optical disc apparatus though the voltage that is output from the DSP 8 is made constant. By this reason it is not preferable that in structure at which the prescribed time interval T is decided simply by calculation as below using only setting values, the moving distance of the objective lens 22 is different in every optical disc apparatus.

$$T=0.25 \times WD/(\text{moving speed of the objective lens})$$

As a result, in the present invention structure is employed in which the prescribed time interval T is calculated based on the time lapse to move that is obtained in step S21 in order that the moving distance of the objective lens 22 becomes the same in every optical disc apparatus.

Figure 6:
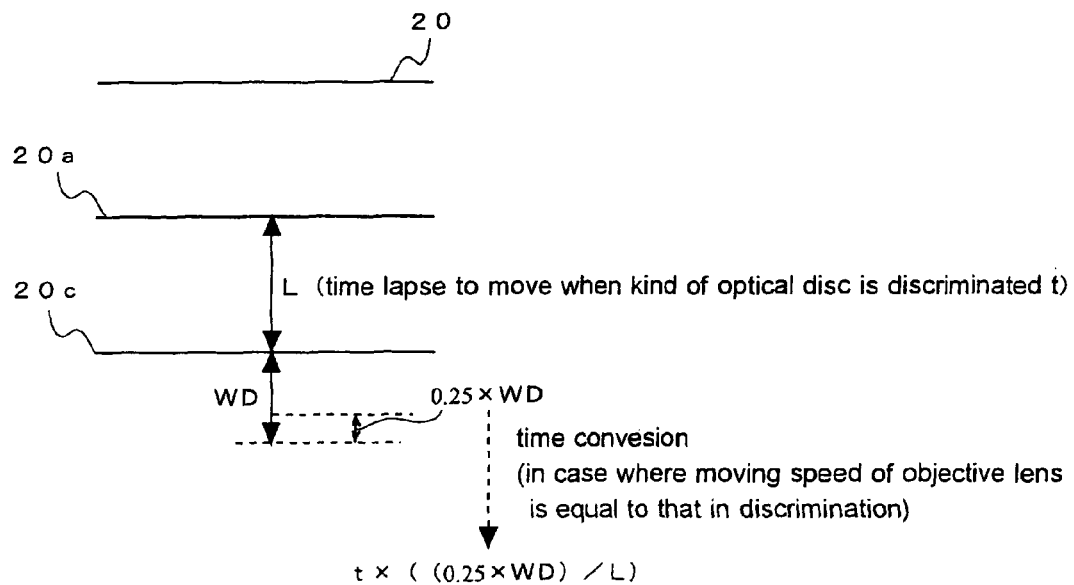
FIG. 6 is a diagram to explain a method calculating a prescribed time interval T in the optical disc apparatus according to the present embodiment.
Figure 7:
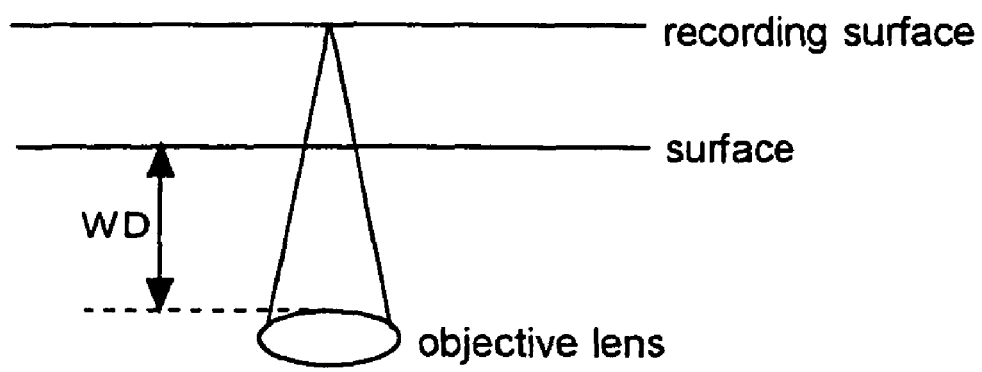
FIG. 7 is a diagram to explain working distance (WD).

FIG. 6 is a diagram to explain a method to calculate the prescribed time interval T in the optical disc apparatus 1 according to the present embodiment. As shown in FIG. 6, the time lapse to move t which is obtained in step S21 is time that is required for the focus position of the objective lens 22 to move the distance L from the surface 20c of the optical disc 20 to the recording surface 20a. Because of this, the time lapse for the objective lens 22 to move the distance of a quarter of the WD is calculated by a formula "t×((0.25×WD)/L)", under an assumption that the moving speed of the objective lens 22 is the same as that in step S1.

However, there may be a case where the moving speed v1 of the objective lens 22 in step S21 (which is the moving speed of the objective lens 22 when the actual measured value t is seeked) and the moving speed v2 of the objective lens 22 moved to start the focus control (moving speed of the objective lens 22 in step S25) are different. Because of this, the prescribed time interval T is calculated by multiplication of ratio of the respective moving speeds as below formula (1).

$$T=t \times (0.25 \times WD)/L) \times (v1/v2) \quad (1)$$

It should be noted that, in the formula (1), the prescribed time interval T is seeked using the moving speed of the objective lens 22 v2 when the focus control is started. By this method when the focus control is performed, the collision between the optical disc 20 and the objective lens 22 can be avoided in principle, in case where the objective lens 22 further continues to move in the prescribed speed (which is the above described v2) even when the detection of the S-curve is missed, because the distance for the objective lens 22 to move from the time point when the FOK signal is negated, is set in enough small distance with regard to the WD (which is one quarter of the WD).

On the other hand, when the focus control is performed, there may be a case where the moving speed of the objective lens 22 does not agree with the moving speed v2 in case where the focus control is missed by uncontrollable movement of the objective lens 22 after the focus control is started. Because of this, there still possibility remains that the optical disc 20 and the objective lens 22 collide with each other, if the prescribed time interval T which is calculated by the formula (1) is used.

However, in the present embodiment, the prescribed time interval T is pretty short time too because the distance which is assumed that the objective lens 22 may be moved from the time point when the FOK signal is negated, is enough small distance with regard to the WD when the prescribed time interval T is calculated. By this arrangement, the probability that the optical disc 20 and the objective lens 22 collide with each other can be constrained low even in case where the focus control is missed by uncontrollable movement of the objective lens 22 after the focus control is started once.

It should be noted that, in the present embodiment, the structure is employed in which the prescribed time interval T is decided such that the moving distance for the objective lens 22 to move from the time point when the FOK signal is negated, becomes the distance of one quarter of the WD, however, the present invention is not intended to be limited to the structure. It is no problem that any other structure is employed in which the prescribed time interval T is decided as far as it is a time interval that can prevent malfunction by chattering of the signal and that can constrain the probability of the collision between the optical disc 20 and the objective lens 22 low. That is, it is necessary that the coefficient which is multiplied to the WD is larger than zero and smaller than one in formula (1), and it is preferable that the upper limit is smaller than one half (½).

As above described, by the optical disc apparatus 1 according to the present embodiment, possibility of collision between the objective lens 22 and the optical disc 20 can be reduced while malfunction by chattering of the signal is prevented when focus control is performed. Further, the operation to prevent the collision between the objective lens and the optical disc can be performed with reducing fluctuation among the apparatus.

The above described embodiment is mere an example and the present invention is not limited to the above described embodiment, and various modification can be introduced within a scope of the object of the present invention.

In the above described embodiment the structure is employed in which the summed up signal is used to obtain the FOK signal. However, the present invention is not intended to be limited to the structure. It is no problem that structure is employed in which, for example, a part summed up signal is used that is not made by all the signals which are output from the plurality of photo receiving areas which are formed in the photo detector 24, but a part of the signals.

Further, in the above described embodiment, the structure is employed in which the time lapse to move that is required for the focus position of the objective lens 22 to move from the surface 20c of the optical disc 20 to the recording surface 20a, is obtained when kind of the optical disc 20 is discriminated. However, the present invention is not limited to this structure and it is no problem structure is employed in which the time lapse to move is obtained separately from discrimination of kind of the optical disc 20, of course.

Further, in the above described embodiment, the structure is employed in which kind of the optical disc for that the optical disc apparatus can perform reproducing or recording of information, are the BD, the DVD, and the CD. However, the present invention is not intended to be limited to the structure. It is no problem that structure is employed in which the optical disc apparatus is applied to other kind of optical discs, for example, and it is no problem that number of kind of the optical disc to which the optical disc apparatus is applied, is other than three kinds.

Further, the present invention can be applied to the optical disc apparatus which can perform reproducing or recording of information for a multilayer optical disc, of course. In addition, the present invention can be applied to the optical disc apparatus which is made for playback only, of course.

According to the present invention, it is possible to provide an optical disc apparatus by which possibility of collision between the objective lens and the optical disc can be reduced when focus control is performed. That is, the present invention can provide an optical disc apparatus which has high reliability, and the present invention is useful in industry.

What is claimed is:

1. An optical disc apparatus comprising:
   a light source;
   an objective lens which focuses light that is emitted from the light source on a recording surface of an optical disc;
   a photo detecting portion which receives reflected light that is reflected by the optical disc to perform photoelectric conversion;

an objective lens actuator which moves the objective lens along a focus direction;

a focus control portion which performs focus control such that a state is realized where a focus position of the objective lens is always matched on the recording surface by controlling the objective lens actuator;

a first signal generating portion which generates a first signal that is obtained by processing signal which is output from the photo detecting portion, and which shows a peak in case where the focus position of the objective lens is matched on the recording surface;

a second signal generating portion which generates a second signal that is obtained by slicing the first signal at a prescribed level and digitalizing; and a movement stopping portion which is configured to receive the second signal, and which is further configured to stop movement of the objective lens by the objective lens actuator if a prescribed condition is fulfilled when the focus control portion performs the focus control, wherein the prescribed condition is that the second signal is asserted by existence of the recording surface that is a target to be reproduced or to be recorded, and thereafter the second signal is negated and then remains in the negated state for a predetermined time interval calculated by formula (1) below:

$$\text{the prescribed time interval } T = t \times ((\alpha \times WD)/L) \times (v1/v2) \quad (1)$$

where t: an actually measured movement time which is determined based on the first signal and which is required for the focus position of the objective lens to move from the surface of the optical disc to the recording surface when the objective lens is moved at a prescribed speed by the objective lens actuator, $\alpha$: a coefficient which fulfils $0 < \alpha < 1$, WD: distance from tip of the objective lens to the surface of the optical disc when the focus position of the objective lens is matched on the recording surface, L: distance from the surface of the optical disc to the recording surface, v1: speed at which the objective lens actuator moves the objective lens when the actually measured value t is determined, and v2: speed at which the objective lens actuator moves the objective lens when the focus control portion starts the focus control.

2. The optical disc apparatus according to claim 1, wherein the actually measured value t determined when kind of the optical disc that is loaded in the apparatus is discriminated.

3. The optical disc apparatus according to claim 1, wherein the photo detecting portion is provided with a plurality of photo receiving areas, and the first signal is a summed up signal of signals that are output from the plurality of photo receiving areas.

4. The optical disc apparatus according to claim 2, wherein the photo detecting portion is provided with a plurality of photo receiving areas, and the first signal is a summed up signal of signals that are output from the plurality of photo receiving areas.

* * * * *